(12) United States Patent
Benson et al.

(10) Patent No.: US 7,097,563 B2
(45) Date of Patent: Aug. 29, 2006

(54) CONSTANT VELOCITY UNIVERSAL JOINT DIAPHRAGM SEAL

(75) Inventors: Robert A Benson, Royal Oak, MI (US); Rhae M Suarez, Southfield, MI (US); Anthony R Burg, Macomb Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 70 days.

(21) Appl. No.: 10/625,676

(22) Filed: Jul. 23, 2003

(65) Prior Publication Data
US 2005/0009612 A1    Jan. 13, 2005

(51) Int. Cl.
F16D 3/76    (2006.01)
(52) U.S. Cl. ........................................ 464/17; 464/906
(58) Field of Classification Search ................ 464/17, 464/133, 175, 905, 906; 92/104; 220/624, 220/670–672; 277/636
See application file for complete search history.

(56) References Cited

U.S. PATENT DOCUMENTS

| | | | |
|---|---|---|---|
| 781,180 A * | 1/1905 | Brabant .................. 464/175 X |
| 2,046,584 A | 7/1936 | Rzeppa | |
| 2,354,961 A * | 8/1944 | O'Donnell .............. 464/133 X |
| 2,362,456 A * | 11/1944 | Alden ..................... 464/175 X |
| 3,149,883 A * | 9/1964 | Reilly ..................... 220/624 X |
| 3,817,057 A * | 6/1974 | Orain ...................... 464/175 X |
| 3,858,412 A * | 1/1975 | Fisher et al. ............ 464/175 X |
| 4,262,498 A * | 4/1981 | Krude et al. ............ 464/175 X |
| 4,319,467 A | 3/1982 | Hegler et al. | |
| 5,078,652 A | 1/1992 | Baker | |
| 6,010,409 A | 1/2000 | Johnson | |
| 6,220,967 B1 | 4/2001 | Miller | |
| 6,368,224 B1 | 4/2002 | Knodle et al. | |
| 6,533,669 B1 | 3/2003 | Knodle et al. | |
| 6,540,616 B1 * | 4/2003 | Miller et al. ................. 464/17 |

* cited by examiner

*Primary Examiner*—Greg Binda
(74) *Attorney, Agent, or Firm*—Thomas A. Jurecko

(57) ABSTRACT

A universal joint assembly has a housing and a universal joint in a chamber within the housing. A diaphragm seal in the housing forms a wall of the chamber. The chamber is substantially sealed to exclude entry of foreign elements. The diaphragm seal is flexible to allow for expansion and contraction of the chamber due to changes in temperature to prevent any substantial increase or decrease in the pressure within the chamber.

3 Claims, 2 Drawing Sheets

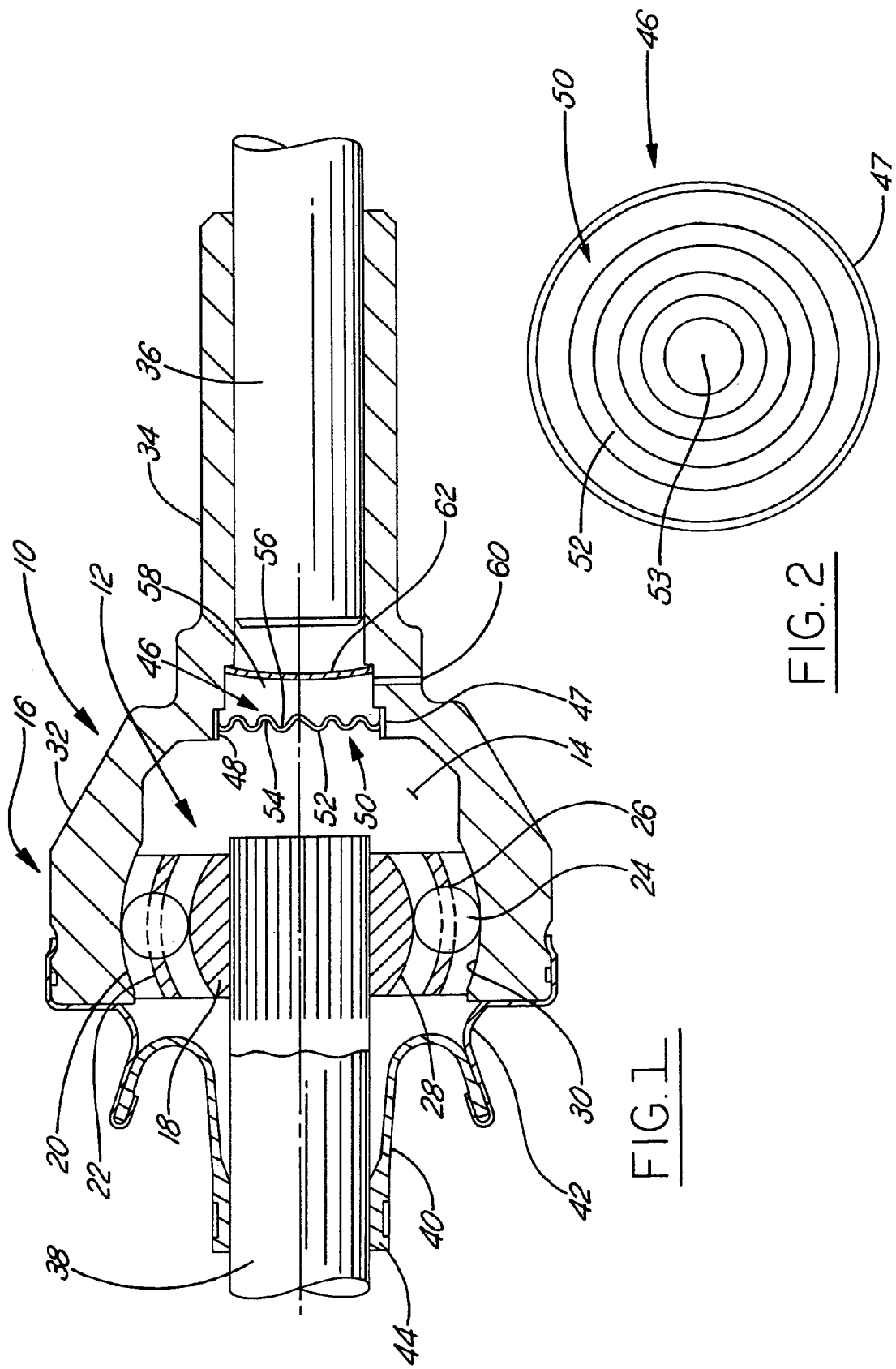

CONSTANT VELOCITY UNIVERSAL JOINT DIAPHRAGM SEAL

FIELD OF THE INVENTION

This invention relates generally to universal joints and more particularly to a sealed universal joint.

BACKGROUND OF THE INVENTION

The internal temperature of a constant velocity universal joint changes due to the moving internal components and the influence of the external environment. These temperature fluctuations tend to cause changes in the internal pressure of the joint. However, it is important to keep the internal pressure more or less equal to the outside atmospheric pressure because if the internal pressure changes, the boot, which closes the sealed chamber in which the joint operates, may deform and cause a failure of the seal. In the past, internal pressure equalization has been accomplished by adding one or more vent holes to the outer race or grease cap, or placing a groove in the mating interface between the inner race stub shaft and the boot. The drawback of these attempts at pressure equalization is that the joint can ingest contaminates through the vent holes, often resulting in joint failure.

SUMMARY OF THE INVENTION

In accordance with the present invention, a diaphragm seal is added to the chamber in which the joint operates. The diaphragm seal is capable of expanding and contracting to minimize pressure fluctuation and maintain the internal pressure more or less equal to the external pressure. As the temperature within the joint increases, the diaphragm seal will expand, allowing an increase in the volume of the chamber without significantly changing the internal pressure. Likewise, when the temperature within the joint decreases, the diaphragm seal will contract, allowing a decrease in the internal volume without material change in the internal pressure. Therefore, as the internal temperature increases and decreases, the diaphragm seal will "breathe" to maintain an equalized pressure with the atmosphere.

Further, in accordance with the invention, the diaphragm seal separates the internal chamber from a vent space, with a vent hole or holes from the vent space. As a result, the diaphragm seal can expand and contract more freely.

The diaphragm is preferably made of a flexible or stretchable elastomeric material. In one embodiment of the invention, the diaphragm seal includes a flexible sheet having a plurality of concentric circular portions of progressively increasing radius measured from a centerpoint of the sheet, with alternate circular portions having a generally U-shaped cross-section opening toward the chamber and the remaining circular portions having a generally U-shaped cross-section opening away from the chamber. In another embodiment of the invention, the diaphragm is a flat sheet of flexible, stretchable, elastomeric material.

One object of this invention is to provide a universal joint having the foregoing features and capabilities.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a longitudinal sectional view of a sealed constant velocity universal joint having a diaphragm seal and constructed in accordance with the invention;

FIG. 2 is a view of the diaphragm seal taken on the line 2—2 in FIG. 1;

DETAILED DESCRIPTION OF THE PREFERRED EMBODIMENTS

The following description of the preferred embodiments is merely exemplary in nature and is in no way intended to limit the invention, its application or uses.

Figure 3:
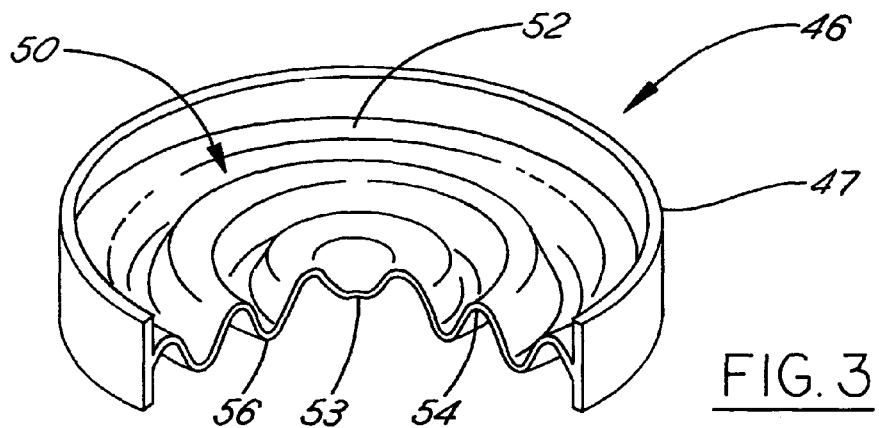
FIG. 3 is a perspective view of the diaphragm seal with parts broken away.

Referring now more particularly to the drawings and especially to FIGS. 1–3, a universal joint assembly 10 is shown comprising a universal joint 12 operable in a chamber 14 provided in a housing 16.

The universal joint 12 comprises an inner spherical race 18, an outer spherical race 20, a spherical cage 22 between the inner and outer races 18 and 20, and balls 24 in slots 26 of the cage engaged in axially extending grooves 28 in the inner race 18 and axially extending grooves 30 in the outer race 20.

The housing 16 includes a bell-shaped hollow block 32 which has the outer race 20 formed as a part thereof. The block 32 has a tubular extension 34 which is splined or otherwise secured to a shaft 36. A shaft 38 is splined or otherwise secured to the inner race 18.

As is typical in constant velocity universal joints, the speed of rotation of the shafts 36 and 38 is always the same no matter what the relative angular adjustment of the two shafts may be.

The chamber 14 is sealed at one side of the universal joint 12 by a boot 40 and an annular boot can 42. The boot 40 is generally tubular and at one end 44 encircles and seals against the shaft 38. The other end of the boot is turned radially outwardly and folded back and has a sealed connection to one end of the boot can 42. The boot can 42 at its opposite end encircles and is sealed to the outer surface of the bell-shaped block 32.

The chamber 14 at the opposite side of the universal joint 12 is sealed by a diaphragm seal 46. The diaphragm seal 46 actually forms a wall of the chamber 14. The diaphragm seal 46 has a circular supporting ring 47 secured and sealed by any means such as a suitable adhesive to a counter-bore 48 in the bell-shaped block 32.

The diaphragm seal 46 includes a flexible sheet 50 which is surrounded by and marginally secured to the supporting ring 47. The sheet 50 has a wavy or sinuous configuration with a plurality of concentric annular, circular portions 52 of progressively increasing radius measured from a centerpoint 53 of the sheet. Alternate circular portions 54 have a generally U-shaped cross-section opening toward the chamber 14 and the remaining circular portions 56 have a generally U-shaped cross-section opening away from the chamber.

The entire diaphragm seal 46 including the flexible sheet 50 and the supporting ring 47 is of integral one-piece construction, and preferably made of natural or synthetic rubber or other suitable, flexible, stretchable elastomeric material which is imperforate to completely seal the chamber 14 from the outside environment.

The diaphragm seal 46 separates the chamber 14 from a vent space 58. One or more vent holes 60 in the block 32 provide communication between the vent space and the outside environment.

Outwardly of the diaphragm seal 46, the vent space 58 is closed by a Welch plug 62 or the like.

The chamber 14 is completely sealed off from the outside environment. Pressure changes in the chamber 14 due to changes in temperature are at least significantly reduced if not entirely eliminated by the diaphragm seal 46 which is capable of expanding to prevent an increase in pressure or contracting to prevent a decrease in pressure so that the pressure within the chamber remains virtually the same without the need for venting the chamber. The vent space 58 and vent hole 60 enable the diaphragm seal to flex inwardly or outwardly more freely.

Figure 4:
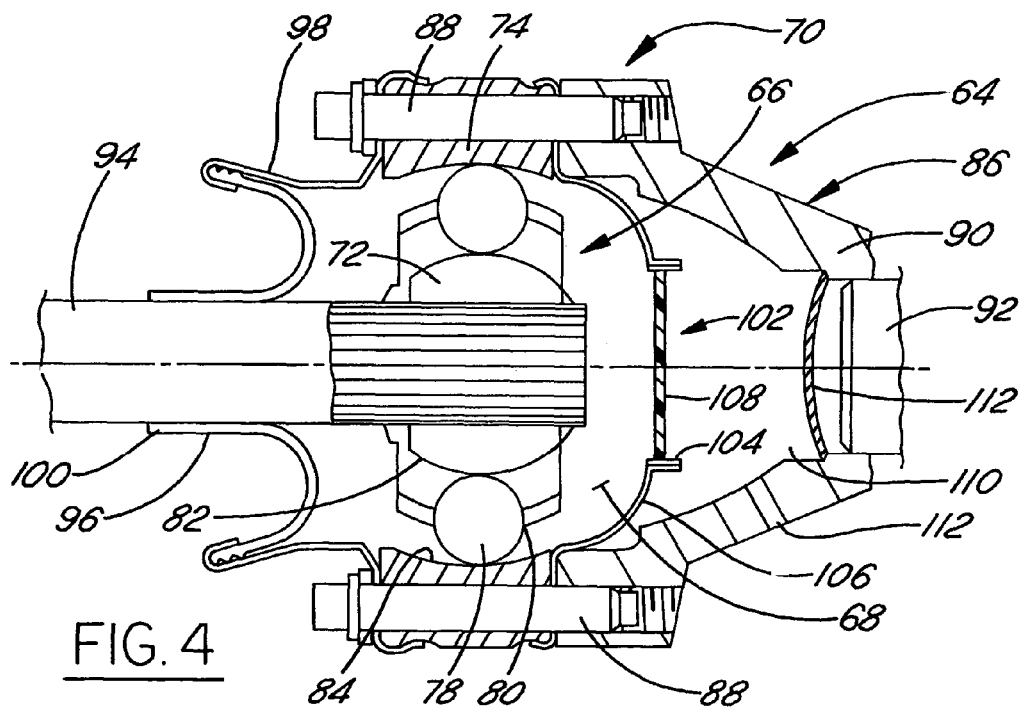
FIG. 4 is a sectional view of a sealed universal joint of modified construction, also constructed in accordance with the invention.
Figure 5:
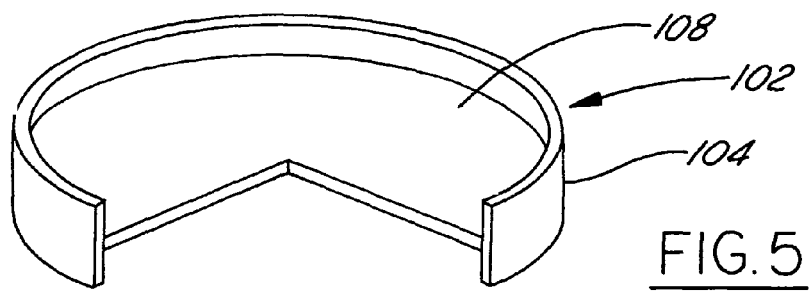
FIG. 5 is a perspective view of the diaphragm seal in FIG. 4, with parts broken away.

FIGS. 4 and 5 show a universal joint system 64 of modified construction having a universal joint 66 operable in a chamber 68 provided in a housing 70.

The universal joint 66 comprises an inner spherical race 72, an outer spherical race 74, and a spherical cage 76 between the inner and outer races 72 and 74, and balls 78 in slots 80 of the cage engaged in axially extending grooves 82 in the inner race 72 and axially extending grooves 84 in the outer race 74.

The housing 70 includes a bell-shaped hollow block 86 to which the outer race 74 is secured by fasteners 88. The block 86 has a tubular extension 90 which is splined or otherwise secured to a shaft 92. A shaft 94 is splined or otherwise secured to the inner race 72.

The chamber 68 is sealed at one side of the universal joint 66 by a boot 96 and a boot can 98. The boot 96 is generally tubular and at one end 100 encircles and seals against the shaft 94. The other end of the boot 96 is turned radially outwardly and folded back and has a sealed connection to one end of the boot can 98. The boot can 98 at its opposite end encircles and is sealed to the outer surface of the bell-shaped block 86.

The chamber 68 at the opposite side of the universal joint 66 is sealed by a diaphragm seal 102. The diaphragm seal 102 actually forms a wall of the chamber 68. The diaphragm seal 102 has a circular supporting ring 104 secured and sealed by any means such as a suitable adhesive to one end of an annular grease cap 106. The other end of the grease cap 106 is clamped and sealed between the block 86 and the outer race 74.

The diaphragm seal 102 includes a flexible sheet 108 which is substantially flat and is surrounded by and marginally connected to the supporting ring 104. The entire diaphragm seal 102 including the supporting ring 104 and the flexible sheet 108 is of integral one-piece construction, and preferably made of natural or synthetic rubber or other suitable, flexible, stretchable elastomeric material which is imperforate to completely seal the chamber 68 from the outside environment.

As in the first embodiment, the diaphragm seal 102 separates the chamber 68 from a vent space 110. One or more vent holes 112 in the block 86 provide communication between the vent space and the outside environment.

Outwardly of the diaphragm seal 102, the vent space 110 is closed by a Welch plug 112 or the like.

As in the embodiment of FIGS. 1–3, the chamber 68 is completely sealed off from the outside environment with the advantage, due to the diaphragm seal 102, of enabling the chamber to expand and contract and thereby minimize if not virtually eliminate pressure changes within the chamber. Also, as in the first embodiment, the vent space 110 and vent holes 112 enable the diaphragm seal to flex inwardly and outwardly more freely.

It should be understood that, if desired, in FIG. 1 the diaphragm seal 46 could be replaced by the diaphragm seal 102, and in FIG. 4 the diaphragm seal 102 could be replaced by the diaphragm seal 46.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In a universal joint assembly having a housing and a universal joint in a chamber within the housing, the assembly comprising;

a diaphragm seal in said housing forming a wall of said chamber, said chamber being substantially sealed to exclude entry of foreign elements, said diaphragm seal being flexible to allow for expansion and contraction of said chamber to prevent any substantial increase or decrease in the pressure within the chamber, and said diaphragm seal including a flexible sheet having a plurality of concentric annular, circular portions of progressively increasing radius, alternate circular portions having a generally U-shaped cross-section opening toward chamber and remaining circular portions having a generally U-shaped cross-section opening away from said chamber, wherein said diaphragm seal separates said chamber from a vent space, and further including a vent hole from said vent space.

2. The universal joint assembly of claim 1 wherein said flexible sheet comprises a sinuous sheet of elastomeric material.

3. The universal joint assembly of claim 1 wherein said vent space and vent hole enable the diaphragm seal to flex inwardly or outwardly more freely.

* * * * *